3,317,459
RUBBERS STABILIZED WITH THE REACTION PRODUCT OF HALO OLEFINS AND PHENOLS
Ronald B. Spacht, Kent, Ohio, assignor to The Goodyear Tire & Rubber Company, Akron, Ohio, a corporation of Ohio
No Drawing. Filed Nov. 22, 1963, Ser. No. 325,748
8 Claims. (Cl. 260—45.95)

This invention relates to age resistors for oxidizable organic materials, their preparation and use in the stabilization of organic materials such as rubber, gasoline, oils, etc., which normally tend to deteriorate when exposed to normal atmospheric conditions and in particular when exposed to sunlight and/or elevated temperatures in the presence of air or oxygen.

Rubber, both natural and synthetic, has proven to be one of the most difficult organic materials to successfully stabilize against the deleterious effects of oxygen and ozone. Both cured and uncured natural and synthetic elastomers are susceptible to the deleterious effects that are found in normal atmospheric conditions, and although many materials have been suggested and used as rubber stabilizers, no completely satisfactory material has been found that will fully protect rubber under the widely different conditions to which it is subjected. The search for new and better rubber stabilizers is therefore a problem which continues to command the attention of many skilled investigators.

Phenolic compounds have been among the more commonly used class of compounds that have found wide scale acceptance as rubber stabilizers, but many of the phenolic antioxidants, although reasonably effective stabilizers for organic materials, tend to impart discoloration and staining to the materials they are intended to stabilize. An additional problem that is not successfully solved by many of the previously known phenolic stabilizers is that they are in varying degrees susceptible to being too readily volatilized, and therefore escape from the materials which they are intended to stabilize during the rather extended service life to which such materials are subjected.

It is therefore an object of this invention to provide a new class of phenolic antioxidants. Another object of this invention is to provide a new class of stabilizers for organic compounds that are relatively non-discoloring and non-volatile.

In accordance with the present invention it has been found that the foregoing and additional objectives can be accomplished by employing as stabilizers for organic materials which are subject to the deleterious effects of oxygen, ozone and sunlight, phenolic compounds selected from the group consisting of alkylated 2-butenylene bis phenols and polymers thereof. Preferred compounds of the present invention conform to the following structural formula:

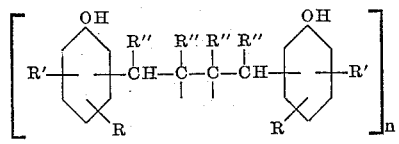

wherein R is selected from the group consisting of alkyl radicals containing from 1 to 12 carbon atoms, cycloalkyl radicals containing from 5 to 6 carbon atoms, benzyl radicals and phenylethyl radicals, R' is selected from the group consisting of hydrogen and alkyl radicals containing from 1 to 12 carbon atoms, R'' is selected from the group consisting of hydrogen and alkyl radicals containing from 1 to 4 carbon atoms and $n$ is an integer from 1 to 5. When $n$ is one in the above formula the free bonds shown become a double bond. When $n$ is more than 1 the double bond opens and adds on to similar molecules forming dimers, trimers and polymers. Examples of specific compounds that conform to the above recited structural formula are:

2,2'-(2''-butenylene)-bis-(4-methyl phenol)
2,2'-(2''-butenylene)-bis-(4-ethyl phenol)
2,2'-(2''-butenylene)-bis-(4-isopropyl phenol)
2,2'-(2''-butenylene)-bis-(4-octyl phenol)
2,2'-(2''-butenylene)-bis-(4-cyclohexyl phenol)
2,2'-(2''-butenylene)-bis-(4-benzyl phenol)
2,2'-(2''-butenylene)-bis-(4-methyl-6-tert. butyl phenol)
2,2'-(2''-butenylene)-bis-(4-ethyl-6-tert. hexyl phenol)
2,2'-(2''-butenylene)-bis-(4-propyl-6-tert. octyl phenol)
2,2'-(2''-butenylene)-bis-(4-octyl-6-tert. amyl phenol)
2,2'-(2''-butenylene)-bis-(4-cyclohexyl-6-tert. butyl phenol)
2,2'-(2''-butenylene)-bis-(4-benzyl-6-tert. butyl phenol)
4,4'-(2''-butenylene)-bis-(2-methyl phenol)
4,4'-(2''-butenylene)-bis-(2-tert. butyl phenol)
4,4'-(2''-butenylene)-bis-(2-cyclohexyl phenol)
4,4'-(2''-butenylene)-bis-(2-methyl-6-tert. butyl phenol)
4,4'-(2''-butenylene)-bis-(2-benzyl-6-tert. hexyl phenol)
4,4'-(2''-butenylene)-bis-(2-6 ditertiary butyl phenol)
4,4'-(2''-butenylene)-bis-(2-cyclohexyl-6 tert. butyl phenol)
4,4'-(2''-butenylene)-bis-(phenol)
4,4'-(2''-butenylene)-bis-(2-tert. butyl phenol)
2,2'-(2''-1'' methyl butenylene)-bis-(4 methyl phenol)
2,2'-(2''-1'',4'' dimethyl butenylene)-bis-(4-methyl phenol)
2,4'-(2''-butenylene)-bis-(3-methyl phenol)
3,3'-(2''-1'' butyl butenylene)-bis-(4 isopropyl phenol)
2,3'-(2''-1'' ethyl butenylene)-bis-(4 dodecyl phenol)

In accordance with the above recited structural formula polymers of any of the above listed monomeric compounds are also to be considered as examples of stabilizers of the present invention.

The more preferred compounds of the present invention are those which conform to the following structural formula:

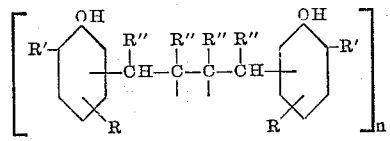

wherein R is selected from the group consisting of hydrogen and alkyl radicals containing from 1 to 12 carbon atoms, cycloalkyl radicals containing from 5 to 6 carbon atoms, benzyl radicals and phenylethyl radicals, R' is selected from the group consisting of tertiary alkyl radicals containing from 4 to 12 carbon atoms and $n$ is an integer from 1 to 5. When $n$ is one in the above formula the free bonds shown become a double bond.

Specific compounds which conform to the above structural formula are:

2,2'-(2''-butenylene)-bis-(4-methyl-6-tert. butyl phenol)
2,2'-(2''-butenylene)-bis-(6-tert. butyl phenol)
2,3'-(2''-butenylene)-bis-(4-methyl-6-tert. octyl phenol)
2,3'-(2''-butenylene)-bis-(4-isopropyl-6-tert. amyl phenol)
2,4'-(2''-1'' methyl butenylene)-bis-(5-methyl-6-tert. butyl phenol)
2,2'-(2''-butenylene)-bis-(6-tert. hexyl phenol)
2,2'-(2''-1'' ethyl butenylene)-bis-(4-butyl-6-tert. octyl phenol)
2,2'-(2''-butenylene)-bis-(4-butyl-6-tert. octyl phenol)

The most preferred compounds of the present invention are in particular those which conform to the following structural formula wherein the linking portion of the molecule is derived from 2-butene:

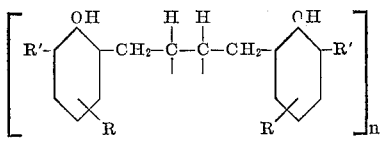

wherein R is selected from the group consisting of hydrogen and alkyl radicals containing from 1 to 12 carbon atoms, cycloalkyl radicals containing from 5 to 6 carbon atoms, benzyl radicals and phenylethyl radicals, R' is selected from the group consisting of tertiary alkyl radicals containing from 4 to 12 carbon atoms and $n$ is an integer from 1 to 5. When $n$ is one in the above formula the free bonds shown become a double bond. Specific compounds conforming to this preferred structure are:

2,2'-(2''-butenylene)-bis-(4-methyl-6-tert. butyl phenol)
2,2'-(2''-butenylene)-bis-(4-ethyl-6-tert. hexyl phenol)
2,2'-(2''-butenylene)-bis-(4-isopropyl-6-tert. amyl phenol)
2,2'-(2''-butenylene)-bis-(4-benzyl-6-tert. butyl phenol)
2,2'-(2''-butenylene)-bis-(4-cyclohexyl-6-tert. butyl phenol)
2,2'-(2''-butenylene)-bis-(4,6-ditert. butyl phenol)
4,4'-(2''-butenylene)-bis-(2,6-ditert. butyl phenol)
4,4'-(2''-butenylene)-bis-(3-methyl-6-tert. butyl phenol)
4,4'-(2''-butenylene)-bis-(2-tert. butyl phenol)

A specific example of one of the most preferred compounds of this invention is the reaction product obtained by reacting 2-tertiary butyl-4-methyl phenol with 1,4-dichloro-2-butene in a 2:1 molar ratio. This preferred reaction product can also be prepared by butylating the product obtained by the reaction of two moles of 4-methyl phenol with one mol of 1,4-dichloro-2-butene and then reacting the resulting reaction product with approximately two molar proportions of isobutylene.

The compounds of this invention may be prepared by reacting phenols or mono or dialkyl-substituted phenols with $\beta,\beta'$-dihalo olefins either in the presence or absence of a catalyst which will catalyze a dehydrohalogenation reaction. Preferred catalysts include zinc, zinc chloride, iron, ferrous oxide and acid activated clay. These catalysts are effective in promoting both the dehydrohalogenation and polymerization reaction. The polymerization reaction is desirable in order to produce relatively high molecular weight materials which display low volatility. The reactants are normally reacted at elevated temperature for a period of from one to five hours in an inert organic solvent. Preferred solvents are the aromatic and aliphatic hydrocarbons boiling between 50 and 150° C. Examples of preferred solvents are hexanes, heptanes, cyclohexane, toluene, benzene and xylene. The reaction is most conveniently carried out at a temperature between 100 to 150° C. At least two mols of the phenol are reacted with each mol of $\beta,\beta'$-dihalo olefin.

The compounds of this invention may be prepared by reacting either a phenol or a monoalkyl-substituted phenol with the desired $\beta,\beta'$-dihalo olefin in accordance with the above described procedure and subsequently reacting the reaction product obtained from this reaction with an additional olefinic compound in order to produce a resulting product having an additional alkyl substituent on the phenolic rings. Alternatively, the compounds may be prepared by a one-stage reaction in which the original phenolic reactant is substituted with from 1 to 2 alkyl substituents. This phenolic compound is then reacted in accordance with the above described procedure with a $\beta,\beta'$-dihalo olefin.

The phenolic compounds that may be used as initial reactants in producing compounds of the present invention by the two step method conform to the following structural formula

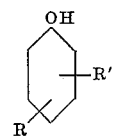

wherein R is selected from the group consisting of hydrogen, alkyl radicals containing from 1 to 12 carbon atoms, cycloalkyl radicals containing from 5 to 6 carbon atoms, benzyl radicals and phenylethyl radicals and R' is selected from the group consisting of hydrogen and alkyl radicals containing from 1 to 12 carbon atoms. If the compounds of the present invention are to be made by the one step method R may not be hydrogen. Examples of specific compounds that conform to the above recited structural formula are:

phenol
o, m, p-cresol
the xylenols
o, m, p ethyl phenols
o, m, p propyl phenols
o, m, p cyclohexyl phenols
o, m, p benzyl phenols
4-tert. butyl phenol
2,4 ditert. butyl phenol
2,6 ditert, butyl phenol
2-tert, butyl-4-methyl phenol
2-tert, butyl-4-isopropyl phenol
2-tert, butyl-4-benzyl phenol The dihalo olefins that are to be employed in preparing the compounds of the present invention must have halogen atoms attached to both of the carbon atoms that are located beta to the double bond. These dihalo olefins conform to the following structural formula

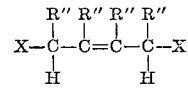

wherein R'' is selected from the group consisting of hydrogen and alkyl radicals containing from 1 to 4 carbon atoms and X is selected from the group consisting of chlorine, bromine and iodine. Examples of specific $\beta,\beta'$-dihalo olefins that are particularly effective in the practice of this invention are:

1,4 diiodo-2-butene
1,4 dichloro-2-butene
1,4 dibromo-2-butene
2-methyl-1,4-dichloro-2-butene
1,4 dichloro-2-pentene
1,4 dibromo-2-pentene
2,5 dichloro-3-hexene
2,5 dibromo-3-hexene
3,6 dichloro-4-octene The following specific examples that show the preparation of compounds conforming to the present invention are intended to be illustrative of the class of compounds disclosed and a method of their preparation but are not to be interpreted as limitations of the invention.

*Example 1*

Three hundred and twenty-four grams of p-cresol and 5.0 grams of $ZnCl_2$ were heated to 80° C. in a suitable reaction vessel. One hundred and twenty-five grams of 1,4 dichloro-2-butene were then added slowly to the reaction mixture. Evolution of HCl occurred almost at once. The reaction was complete in five hours. The reaction mixture was heated to 200° C. at 12 mm. pressure to remove the excess p-cresol. The reaction product weighed 210 grams representing a yield of 87 percent.

Example 2

One hundred and forty grams of the resin from Example 1 were dissolved in toluene, 4.0 grams of concentrated H₂SO₄ were then added and the mixture heated to 80° C. Isobutylene was passed into the reaction vessel slowly over a period of five hours, 31.5 grams of isobutylene were absorbed. The catalyst was destroyed with Na₂CO₃, the mixture was then heated to remove volatiles and filtered. The toluene was removed by heating under vacuo. The yield was 158.5 grams.

Example 3

One hundred and ninety-six grams of monotertiary butyl-p-cresol and 5.0 grams of ZnCl₂ were heated to 120° C. Sixty-one grams of 1,4 dichlorobutene were then added slowly to the reaction mixture. The reaction was complete in approximately two hours as evidenced by the completion of HCl evolution. The catalyst was removed by adding Na₂CO₃, followed by filtration. Unreacted materials were removed by distillation under vacuum. The reaction product weighed 148.0 grams, representing an 88 percent yield.

The compounds of this invention are useful in protecting raw rubber in latex form, coagulated rubber and vulcanized rubber. They are highly efficient and are capable of being employed in relatively small amounts to effectively stabilize the rubbers into which they are incorporated. The precise amount of these highly effective stabilizers which is to be employed will depend somewhat on the nature of the rubber and the severity of the deteriorating conditions to which the rubber is to be exposed. It has been found that an effective antioxidant amount of the disclosed stabilizers will generally range from 0.05 to 5.0 percent by weight based on the weight of the rubber although it is commonly preferred to use from 0.5 to 2.0 percent by weight based on the weight of the rubber. The effective proportions may also be defined as ranging from approximately 0.05 to 5.0 parts by weight per 100 parts by weight of rubber.

The rubbers that may be conveniently protected by the phenolic compounds in accordance with this invention are cured and uncured oxidizable rubber polymers such as natural rubber and those synthetic oxidizable rubbery polymers which are normally susceptible to deterioration by sunlight and atmospheric oxygen. By the term "oxidizable rubbery polymers" as employed in this application is meant natural rubber, the synthetic rubbery polymers and copolymers of conjugated dienes and the polymeric olefins. Representative examples of synthetic oxidizable rubbery polymers which are normally susceptible to deterioration by sunlight and atmospheric oxygen include polychloroprene; polyisoprenes and polybutadienes and in particular polyisoprenes and polybutadienes having essentially all of their monomer units combined in a cis-1,4 structure; the rubbery copolymers of butadiene and styrene which may contain from 50 to 90 percent or more of butadiene; and butyl rubber which is a polymerization product of a major proportion of a mono-olefin and a minor proportion of a multi-olefin such as butadiene or isoprene; polyolefins containing little or no unsaturation, such as polyethylene, polypropylene, ethylene propylene and terpolymers of ethylene propylene.

In order to evaluate the effectiveness of the compounds of this invention as stabilizers for rubber one part by weight of representative compounds of this invention per 100 parts by weight of rubber were incorporated into the following rubber formulation wherein all proportions are expressed as parts by weight per 100 parts by weight of rubber.

| | |
|---|---|
| Extracted pale crepe | 100.00 |
| Zinc oxide | 5.00 |
| Sulfur | 3.00 |
| Hexamethylenetetramine | 1.00 |
| Stearic acid | 1.50 |
| Antioxidant | 1.00 |

The above-described rubber formulation was cured for 50 minutes at 285° F. The antioxidant efficiency was measured by aging samples of these rubber stocks in an oxygen bomb at 50° C. and 300 p.s.i. for 18 days. The ability of the various rubber samples to withstand the above-described oxygen bomb test is shown by the data in the following table where the antioxidant effectiveness of the various antioxidants was evaluated by measuring the original tensile (OT), and the final tensile (FT) and then calculating the percent tensile retention (TR). The percent weight increase of the rubber samples was also observed.

TABLE I

| Antioxidant | Properties after 18 days aging | | | |
|---|---|---|---|---|
| | OT | FT | Percent TR | Percent Wt. Increase |
| Control (no antioxidant) | 1,750 | 0 | 0 | 17.0 |
| R.P. mono-tert.-butyl-p-cresol and 1,4 dichlorobutene-2 | 1,575 | 1,900 | 120.6 | 0.075 |
| Butylated R.P. of p-cresol and 1,4 dichlorobutene-2 | 1,500 | 1,750 | 116.7 | 0.045 |
| R.P. p-cresol and 1,4 dichlorobutene-2 | 1,500 | 1,300 | 86.7 | 0.16 |

Note.—R.P. means reaction product.

Additional samples of the above-described cured rubber formulations were evaluated in the creep test in accordance with the procedure described in Industrial and Engineering Chemistry, vol. 47, page 165, January 1955. The results obtained in the creep test evaluation are summarized below in Table II.

TABLE II

Antioxidant:                        Hrs. to 10% creep
    Control—no antioxidant _____ 4
    R.P. mono-tert.-butyl-p-cresol and 1,4-dichloro-2-butene _____ 16.4
    Butylated R.P. of p-cresol and 1,4-dichloro-2-butene _____ 22.0
    R.P. of p-cresol and 1,4-dichloro-2-butene ____ 16.2

Note.—R.P. means reaction product.

A consideration of the data presented in the foregoing tables will clearly indicate that the compounds of the present invention are extremely effective rubber stabilizers.

Having provided a complete description of the invention in such manner as to distinguish it from other inventions and from what is old, and having provided a description of the best mode contemplated of carrying out the invention, the scope of patent protection to be granted the invention is defined by the following claims.

What I claim is:

1. The reaction product resulting from the reaction of a mixture containing (1) at least two moles of a phenol conforming to the following structural formula

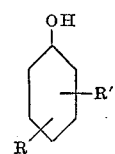

wherein R is selected from the group consisting of alkyl radicals containing from 1 to 12 carbon atoms, cycloalkyl radicals containing from 5 to 6 carbon atoms, benzyl radicals and phenylethyl radicals, and R' is selected from the group consisting of hydrogen and alkyl radicals containing from 1 to 12 carbon atoms, and (2) approximately one mole of a dihalo olefin conforming to the following structural formula

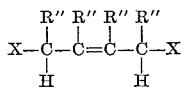

wherein R" is selected from the group consisting of hydrogen and alkyl radicals containing from 1 to 4 carbon atoms and X is selected from the group consisting of chlorine, bromine and iodine.

2. The reaction product obtained by reacting at a temperature between 100 and 150° C. (1) approximately two moles of 2-tertiary butyl-4-methyl phenol with (2) approximately one mole of 1,4-dichloro-2-butene.

3. An oxidizable rubbery polymer containing as an antioxidant in an antioxidant amount the reaction product resulting from the reaction of a mixture containing (1) at least two moles of a phenolic compound conforming to the following structural formula

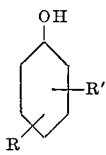

wherein R is selected from the group consisting of alkyl radicals containing from 1 to 12 carbon atoms, cycloalkyl radicals containing from 5 to 6 carbon atoms, benzyl radicals and phenylethyl radicals, and R' is selected from the group consisting of hydrogen and alkyl radicals containing from 1 to 12 carbon atoms, and (2) one mole of a dihalo olefin conforming to the following structural formula

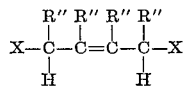

wherein R" is selected from the group consisting of hydrogen and alkyl radicals containing from 1 to 4 carbon atoms and X is selected from the group consisting of chlorine, bromine and iodine.

4. The reaction product prepared by a two step process, the first step comprising reacting a mixture containing (1) at least two moles of a phenol conforming to the following structural formula

wherein R is selected from the group consisting of hydrogen and alkyl radicals containing from 1 to 12 carbon atoms, cycloalkyl radicals containing from 5 to 6 carbon atoms, benzyl radicals and phenylethyl radicals, and (2) approximately one mol of a dihalo olefin conforming to the following structural formula

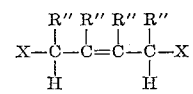

wherein R" is selected from the group consisting of hydrogen and alkyl radicals containing from 1 to 4 carbon atoms and X is selected from the group consisting of chlorine, bromine and iodine, and the second step comprising reacting the reaction product of the first step with an olefinic material containing from 2 to 12 carbon atoms.

5. The reaction product prepared by a two step process, the first step comprising reacting at a temperature between 100 and 150° C. a mixture containing (1) at least two mols of p-cresol and (2) approximately one mol of 1,4-dichloro-2-butene, and the second step comprising reacting the reaction product of the first step with isobutylene.

6. An oxidizable rubbery polymer containing an antioxidant amount of the reaction product according to claim 2.

7. An oxidizable rubbery polymer containing an antioxidant amount of the reaction product according to claim 4.

8. An oxidizable rubbery polymer containing an antioxidant amount of the reaction product according to claim 5.

No references cited.

JOSEPH L. SCHOFER, *Primary Examiner.*

H. I. CANTOR, *Assistant Examiner.*